(12) United States Patent
Komatsu

(10) Patent No.: US 6,384,888 B2
(45) Date of Patent: *May 7, 2002

(54) IN-PLANE SWITCHING MODE LIQUID CRYSTAL DISPLAY DEVICE

(75) Inventor: Hiroshi Komatsu, Kyungsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/752,441

(22) Filed: Jan. 3, 2001

Related U.S. Application Data

(63) Continuation of application No. 09/114,302, filed on Jul. 10, 1998.

(30) Foreign Application Priority Data

Jul. 12, 1997 (KR) .............................................. 97-32462

(51) Int. Cl.[7] ............................................. G02F 1/1393
(52) U.S. Cl. ...................................... 349/141; 349/139
(58) Field of Search ................................ 349/141, 139, 349/138

(56) References Cited

U.S. PATENT DOCUMENTS

| | | |
|---|---|---|
| 4,239,346 A | 12/1980 | Lloyd |
| 4,688,074 A | 8/1987 | Iinuma |
| 4,726,659 A | 2/1988 | Conrad et al. |
| 5,307,189 A | 4/1994 | Nishiki et al. |
| 5,309,264 A | 5/1994 | Lien et al. |
| 5,321,535 A | 6/1994 | Ukai et al. |
| 5,416,661 A | 5/1995 | Koike |
| 5,459,596 A | 10/1995 | Ueda et al. |
| 5,464,669 A | 11/1995 | Kang et al. |
| 5,464,705 A | 11/1995 | Wainwright |
| 5,473,455 A | 12/1995 | Koike et al. |
| 5,492,762 A | 2/1996 | Hirai et al. |
| 5,504,604 A | 4/1996 | Takatori et al. |
| 5,540,784 A | 7/1996 | Ranes |

(List continued on next page.)

FOREIGN PATENT DOCUMENTS

| | | |
|---|---|---|
| EP | 0 368 260 | 5/1990 |
| EP | 0 588 568 A2 | 3/1994 |
| EP | 0 749 029 A1 | 6/1996 |

(List continued on next page.)

OTHER PUBLICATIONS

R. Kiefer et al., "P2–30 In–Plane Switching of Nematic Liquid Crystals," Japan Dislay, pp. 547–550, 1992.
M. Ohta et al., "Development of Super–TFT–LCDs With In–Plane Switching Display Mode," Asia Display, pp. 707–710, 1995.
M. Oh–e, et al., "Principles and Characteristics of Electro–Optical Behaviour With In–Plane Switching Mode," Asai Display, pp. 577–580, 1995.

(List continued on next page.)

*Primary Examiner*—Toan Ton
(74) *Attorney, Agent, or Firm*—Finnegan, Henderson, Farabow, Garrett, & Dunner, L.L.P.

(57) ABSTRACT

An in-plane switching mode liquid crystal display device comprises a substrate, a pixel region, a common bus line, a thin film transistor, a data electrode, a passivation layer over the data electrode and the thin film transistor, and a common electrode. The pixel region lies on the substrate. The common bus line is aligned in the pixel region. The thin film transistor is coupled to the pixel region and the pixel regions comprises a gate electrode and a gate insulator having a portion overlying the gate electrode. The data electrode lies over the gate insulator and has a portion overlying the common bus line to form a first storage capacitor. The passivation layer overlies the data electrode and the thin film transistor. The common electrode overlies the passivation layer and has a portion overlying the data electrode to form a second storage capacitor.

10 Claims, 6 Drawing Sheets

U.S. PATENT DOCUMENTS

| | | | |
|---|---|---|---|
| 5,576,858 | A | 11/1996 | Ukai et al. |
| 5,598,285 | A | 1/1997 | Kondo et al. |
| 5,600,464 | A | 2/1997 | Ohe et al. |
| 5,602,662 | A | 2/1997 | Rosenblatt et al. |
| 5,608,556 | A | 3/1997 | Koma |
| 5,646,705 | A | 7/1997 | Higuchi et al. |
| 5,686,019 | A | 11/1997 | Nakamura |
| 5,686,109 | A | 11/1997 | Fujitsu et al. |
| 5,694,185 | A | 12/1997 | Oh |
| 5,717,474 | A | 2/1998 | Sarma |
| 5,737,051 | A | 4/1998 | Kondo et al. |
| 5,742,369 | A | 4/1998 | Mihara et al. |
| 5,745,207 | A | 4/1998 | Asada et al. |
| 5,757,455 | A | 5/1998 | Sugiyama et al. |
| 5,760,856 | A | 6/1998 | Yanagawa et al. |
| 5,760,857 | A | 6/1998 | Yanagawa et al. |
| 5,781,261 | A | 7/1998 | Ohta et al. |
| 5,786,876 | A | 7/1998 | Ota et al. |
| 5,793,459 | A | 8/1998 | Toko |
| 5,801,802 | A | 9/1998 | Inoue et al. |
| 5,812,226 | A | 9/1998 | Izumi et al. |
| 5,818,560 | A | 10/1998 | Kouno et al. |
| 5,831,701 | A | 11/1998 | Matsuyama et al. |
| 5,841,499 | A | 11/1998 | Baur et al. |
| 5,852,485 | A | 12/1998 | Shimada et al. |
| 5,859,682 | A | 1/1999 | Kim et al. |
| 5,864,376 | A | 1/1999 | Takatori |
| 5,870,160 | A | 2/1999 | Yanagawa et al. |
| 5,886,762 | A | 3/1999 | Lee et al. |
| 5,905,556 | A | 5/1999 | Suzuki et al. |
| 5,907,379 | A * | 5/1999 | Kim et al. ................. 349/141 |
| 5,907,380 | A | 5/1999 | Lien |
| 5,910,271 | A | 6/1999 | Ohe et al. |
| 5,914,762 | A | 6/1999 | Lee et al. |
| 5,914,764 | A | 6/1999 | Henderson |
| 5,917,564 | A | 6/1999 | Kim et al. |
| 5,926,244 | A | 7/1999 | Takeda et al. |
| 5,929,958 | A | 7/1999 | Ohta et al. |
| 5,946,060 | A | 8/1999 | Nishiki et al. |
| 5,946,066 | A | 8/1999 | Lee et al. |
| 5,946,067 | A | 8/1999 | Kim et al. |
| 5,956,111 | A | 9/1999 | Ohta et al. |
| 5,959,708 | A | 9/1999 | Lee et al. |
| 5,969,782 | A | 10/1999 | Lee et al. |
| 5,977,562 | A | 11/1999 | Hirakata et al. |
| 5,982,460 | A | 11/1999 | Zhang et al. |
| 5,995,186 | A | 11/1999 | Hiroshi |
| 6,005,650 | A | 12/1999 | Kim et al. |
| 6,014,090 | A | 1/2000 | Rosen et al. |
| 6,014,190 | A * | 1/2000 | Kim et al. ................. 349/141 |
| 6,040,887 | A | 3/2000 | Matsuyama et al. |
| 6,055,028 | A | 4/2000 | Nishi et al. |
| 6,091,473 | A | 7/2000 | Hebiguchi |
| 6,097,465 | A | 8/2000 | Hiroki et al. |
| 6,124,910 | A | 9/2000 | Nishida et al. |
| 6,133,977 | A * | 10/2000 | Lee et al. ................. 349/141 |
| 6,137,557 | A | 10/2000 | Hebiguchi et al. |
| 6,184,961 | B1 | 2/2001 | Ham |
| 6,201,590 | B1 * | 3/2001 | Ohta et al. ................. 349/141 |

FOREIGN PATENT DOCUMENTS

| | | |
|---|---|---|
| EP | 0 814 367 A2 | 12/1997 |
| JP | 58-2872 | 1/1983 |
| JP | 59-14056 | 8/1985 |
| JP | 62-78532 | 4/1987 |
| JP | 60-217803 | 10/1987 |
| JP | 3-148636 | 6/1991 |
| JP | 04067127 A | 3/1992 |
| JP | 6-160878 | 6/1994 |
| JP | 06273803 | 9/1994 |
| JP | 7-36058 | 2/1995 |
| JP | 07134301 A | 5/1995 |
| JP | 7-225388 | 8/1995 |
| JP | 08062586 | 3/1996 |
| JP | 9-5793 | 1/1997 |
| JP | 09005763 A | 1/1997 |
| JP | 09005764 A | 1/1997 |
| JP | 09005764 | 1/1997 |
| JP | 09033946 | 2/1997 |
| JP | 09043589 A | 2/1997 |
| JP | 09043590 A | 2/1997 |
| JP | 09101538 A | 4/1997 |
| JP | 09105908 A | 4/1997 |
| JP | 09105918 A | 4/1997 |
| JP | 97-22458 | 5/1997 |
| JP | 96-32049 | 9/1997 |
| JP | 09258269 A | 10/1997 |
| JP | 09269507 A | 10/1997 |
| JP | 09325346 | 12/1997 |
| JP | 1998-040330 | 8/1998 |
| JP | 10-319436 | 12/1998 |
| JP | 1998-083765 | 12/1998 |
| KR | 94-07581 | 8/1994 |
| KR | 96-43112 | 12/1996 |
| KR | 98-37086 | 2/1998 |
| WO | 97/10530 | 3/1997 |

OTHER PUBLICATIONS

S. Matsumoto, et al., "LP–A: Display Characteristics of In–Plane–Switching (IPS) LCDs and a Wide–Viewing–Angle 14.5–in. IPS IFT–LCD," Euro Display, pp. 445–448, 1996.

H. Wakemoto, et al., "38.1: An Advanced In–Plane–Switching Mode TFT–LCD," SID 97 Digest, pp. 929–932, 1997.

S.H. Lee, "High–Transmittance, Wide–Viewing–Angle Nematic Liquid Crystal Display Controlled by Fringe–Field Switching," Asia Display, pp. 371–374, 1998.

M. Ohta, et al., "S30–2 Development of Super–TFT–LCDs with In–Plane Switching Display Mode," ASAI Display '95, pp. 707–710.

* cited by examiner

IN-PLANE SWITCHING MODE LIQUID CRYSTAL DISPLAY DEVICE

This is a continuation of application Ser. No. 09/114,302, filed Jul. 10, 1998 which is incorporated herein by reference.

BACKGROUND OF THE INVENTION

A. Field of the Invention

The present invention relates to a liquid crystal display device, and more particularly to an in-plane switching mode liquid crystal display device.

B. Description of the Related Art

Recently, the thin film transistor liquid crystal display device (TFT LCD) has been used as a display device of many applications such as a portable television and a notebook computer, but such TFT LCD has a small viewing angle.

In order to solve this problem, twisted nematic LCDs having optical compensation plates and a multi-domain LCD, and so forth, have been introduced. In these LCDs, however, the color of the image is shifted because the contrast ratio depends on the viewing angle direction.

For a wide viewing angle, an in-plane switching mode LCD is disclosed, for example, in JAPAN DISPLAY 92 p547, Japanese Patent Unexamined Publication No. 7-36058, Japanese Patent Unexamined Publication No. 7-225388, and ASIA DISPLAY 95 P707.

FIG. 1a and FIG. 1b are respectively plane and sectional views showing the conventional in-plane switching mode liquid crystal display device (IPS mode LCD). FIG. 1b is a sectional view taken along line A–A' of FIG. 1a. As shown in these figures, a gate bus line 1 and a data bus line 2 are formed on a first substrate 10, defining a pixel. Although only one pixel is drawn in the figures, a liquid crystal display device generally has a plurality of pixels. A common bus line 3 is aligned in the pixel, being parallel to gate bus line 1. A thin film transistor (TFT) is disposed at the cross of gate and data bus lines 1 and 2. As shown in FIG. 1b, the TFT comprises a gate electrode 5, a gate insulator 12, a semiconductor layer 15, an ohmic contact layer 16 and source/drain electrodes 6 and 7. In the pixel, a data electrode 8 and a common electrode 9 are formed parallel to data bus line 2. A portion of data electrode 8 which overlaps common bus line 3 is formed to obtain a storage capacitor which functions as maintaining a grey level voltage applied into data electrode 8. Common electrode 9 is connected to common bus line 3. Data electrode 8 is formed on gate insulator 12 and is connected to drain electrode 7. The TFT, data electrode 8 and gate insulator 12 are covered with a passivation layer 20. Thereon, a first alignment layer 23a is coated to impart an alignment direction, On a second substrate 11, a black mask 28 is formed to prevent a leakage of light through the regions of the TFT and gate, data and common bus lines 1, 2, and 3. Thereon, a color filter layer 29 and a second alignment layer 23b are formed. Between first and second substrates 10 and 11, a liquid crystal layer 30 is formed.

When a voltage is applied to the conventional IPS mode LCD, an electric field parallel to substrates 10 and 11 is generated between data and common electrodes 8 and 9. Liquid crystal molecules in the pixel are rotated according to the electric field, controlling the amount of light passing through liquid crystal layer 30.

However, the conventional IPS mode LCD has the following problems. First, because the area for storage capacitor occupies quite a portion of the pixel region, and the data and common electrodes are made of opaque metals, the aperture ratio is lowered. Second, because the electric field applied to the LC layer is weakened by both gate insulator 12 and passivation layer 20 formed over two electrodes 8 and 9, the driving speed of the LC molecules is decreased, and consequently the driving voltage is increased. Third, because data bus line 2 should be apart from the pixel region to the extent of not generating the crosstalk problem, the pixel region is decreased, thereby lowering the aperture ratio.

SUMMARY OF THE INVENTION

An object of the present invention is to provide an in-plane switching mode liquid crystal display device having a low driving voltage.

Another object of the present invention is to provide an in-plane switching mode liquid crystal display device having an improved aperture ratio.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises: a substrate; a common bus line over the substrate; a first insulator over the common bus line; a first electrode over the first insulator, the first electrode at least partially covering the common bus line to form a first storage capacitor between the first electrode and the common bus line; a second insulator over the first electrode; and a second electrode over the second insulator, the second electrode at least partially covering the first electrode to form a second storage capacitor between the first and second electrodes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

In the figures.

DETAIL DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

In an in-plane switching mode liquid crystal display device implemented according to the present invention, the common electrode is formed over the passivation layer, and the passivation layer and the gate insulator do not weaken the electric field applied into the liquid crystal layer. Consequently, the driving voltage may be lowered. Further, because the area for storage capacitor can be decreased, the aperture ratio is improved.

Moreover, the common electrode may be formed to overlap the data bus lines to remove the crosstalk problem. In this case, because the pixel region can be enlarged, the aperture ratio becomes much more improved. In order to prevent signal delay in the data bus lines which is generated by being overlapped with the common electrode, the data bus lines is formed of highly conductive metal layers such as a Mo metal layer, Mo/Al/Mo triple metal layers, or Cr/Al/Cr triple metal layers.

Furthermore, the common electrode may be formed of a transparent electrode such as indium tin oxide in order to lower contacting electric resistance between pads and driving circuits as well as to improve the aperture ratio.

Figure 1A:
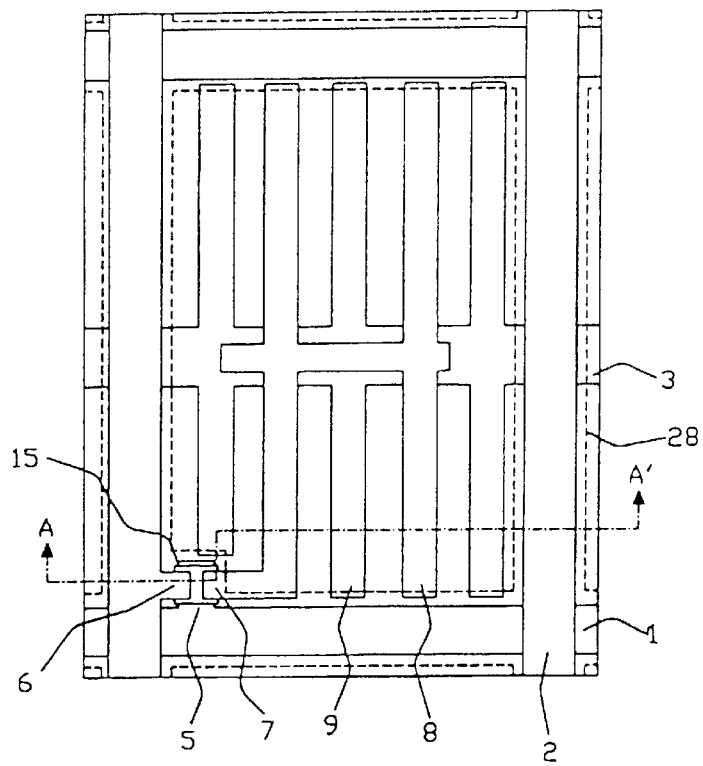
FIG. 1a and FIG. 1b are respectively plane and sectional views of a conventional in-plane switching mode liquid crystal display device.
Figure 1B:
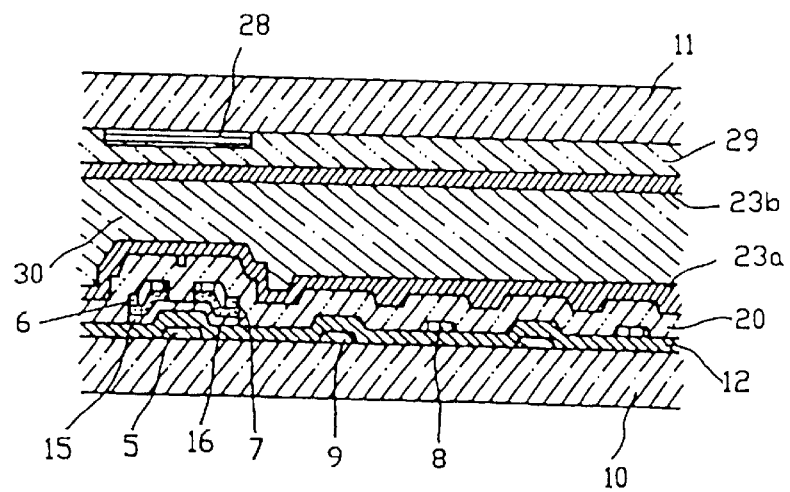
Figure 2:
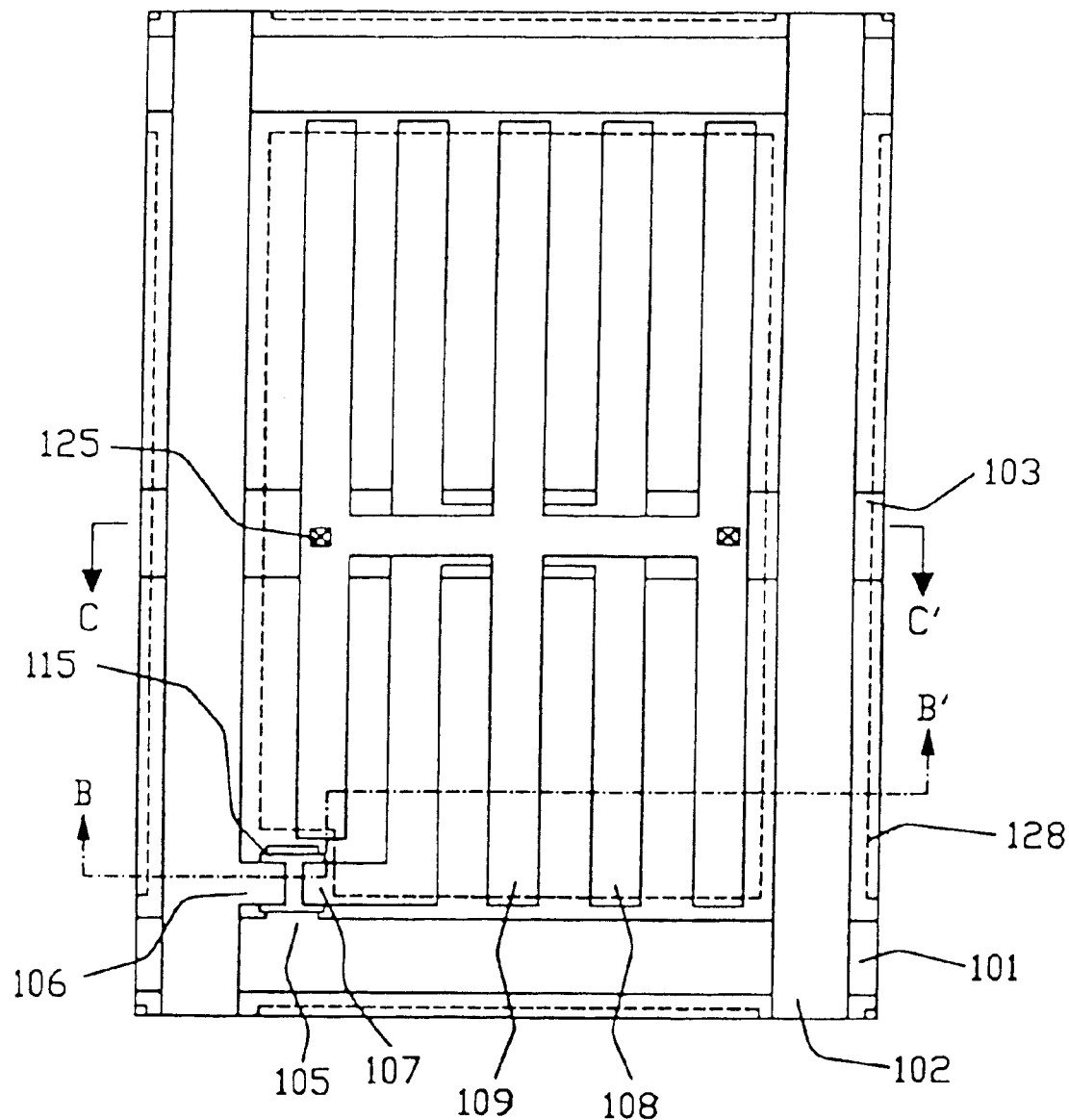
FIG. 2 is a plane view showing a first embodiment according to the present invention.
Figure 3A:
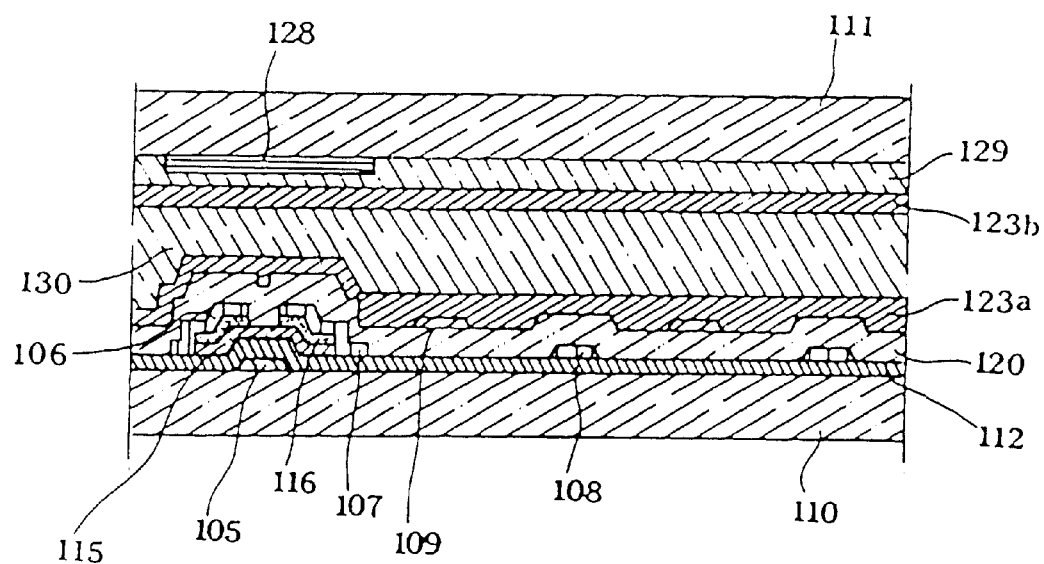
FIG. 3a and FIG. 3b are sectional views of FIG. 2.
Figure 3B:
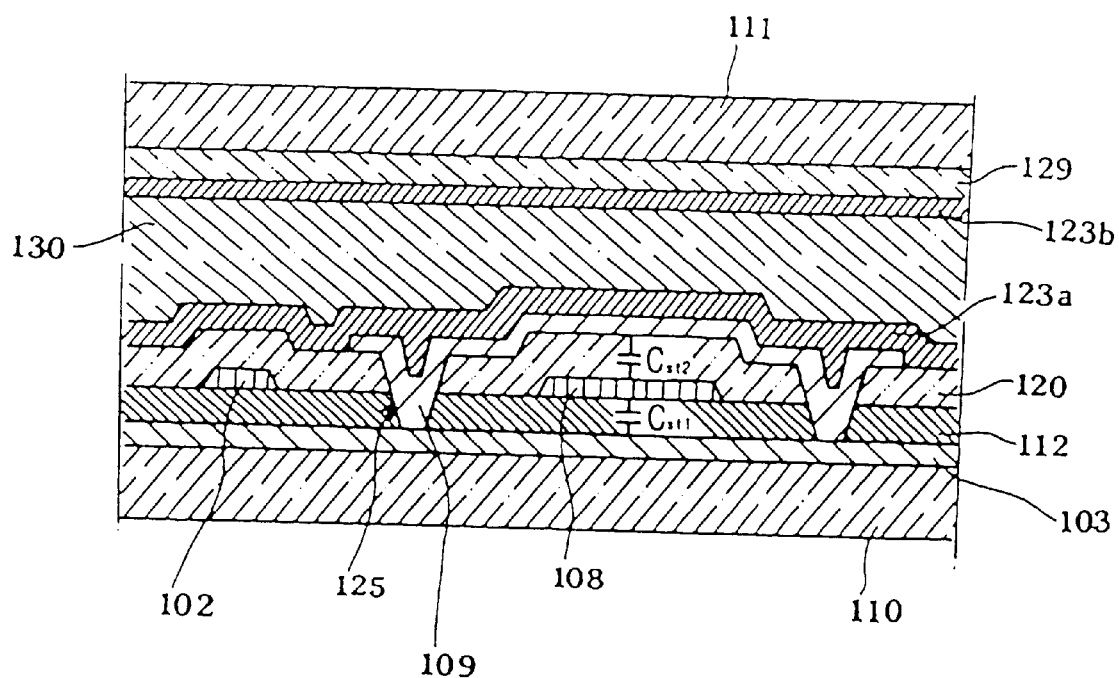

FIG. 2, FIG. 3a and FIG. 3b are views showing a first embodiment according to the present invention. FIG. 3a and FIG. 3b are respectively sectional views taken along line B–B' and line C–C' of the FIG. 2. As shown in these figures, gate and data bus lines 101 and 102 are formed on a first substrate 110, defining a pixel. Although only one pixel is drawn in these figures, a liquid crystal display device generally has a plurality of pixels. In the pixel, a common bus line 103 is formed parallel to the data bus line 102. At the cross of the gate and data bus lines 101 and 102, a thin film transistor (TFT) is formed. In the pixel, data and common electrodes 108 and 109 are disposed parallel to data bus line 102. As in the conventional IPS mode LCD, data electrode 108 has a portion overlapping common bus line 103 for obtaining a first storage capacitor ($C_{st1}$) as shown in FIG. 3b. In addition, common electrode 109 has a portion overlapping data electrode 108 for obtaining a second storage capacitor ($C_{st2}$). Common electrode 109 is connected to common bus line 103 through a hole 125.

As shown in FIG. 3a, the TFT comprises a gate electrode 105, a gate insulator 112, a semiconductor layer 115, an ohmic contact layer 116, and source/drain electrodes 106 and 107. Gate electrode 105 is formed by patterning double metal layers (Mo/Al) composed of an Al layer having a thickness of 2000 Å and a Mo layer having a thickness of 1000 Å, where the double metal layers are deposited by a sputtering method. Gate and common bus lines 101 and 103 are formed together with gate electrode 105. Gate insulator 112 is formed thereon by depositing an inorganic insulating layer such as silicon nitride having a thickness of 4000 Å by a CVD (chemical vapor deposition) method. Semiconductor layer 115 and ohmic contact layer 116 are formed by depositing and etching an amorphous silicon (a-Si) layer having a thickness of 1700 Å and an n$^+$ a-Si layer having a thickness of 300 Å. Data bus line 102 and source/drain electrodes 106 and 107 are formed by etching a Cr metal layer having a thickness of 1500 Å deposited by sputtering method. As shown in FIG. 2, gate and source electrodes 105 and 106 are connected to gate and data bus lines 101 and 102 respectively, and drain electrode 107 is connected to data electrode 108.

The TFT, gate bus line 101 and gate insulator 112 are covered with a passivation layer 120 such as silicon oxide and silicon nitride having a thickness of 2000 Å. On passivation layer 120, common electrode 109 is formed by depositing and etching a transparent conducting layer such as indium tin oxide (ITO) having a thickness of 500 Å.

Over common electrode 109 and passivation layer 120, a first alignment layer 123a is formed by coating polyamide or polyimide or photo-alignment materials. The polyamide or polyimide alignment layer may be rubbed to impart an alignment direction. On the other hand, the photo-alignment layer such as polyvinylcinnamate (PVCN) or polysiloxane based materials is exposed to an ultra violet light to impart the alignment direction.

As shown in FIG. 3b, common electrode 109 is connected to common bus line 103 through hole 125 formed in gate insulator 112 and passivation layer 120. As shown in FIG. 2 and FIG. 3b, data and common electrodes 108 and 109 have portions for first and second storage capacitors ($C_{st1}$, $C_{st2}$). Accordingly, the total storage capacitor ($C_{st}$) in the present invention becomes the sum of the first and second storage capacitors ($C_{st1}$, $C_{st2}$). The storage capacitor ($C_{st}$) is double the conventional storage capacitor ($C_{st1}$), so that the area for storage capacitor can be reduced to half the conventional area, thereby improving the aperture ratio.

As shown in FIGS. 3a and 3b, on a second substrate 111, a black mask 128 and a color filter layer 129 are formed. An overcoat layer may be formed thereon for the flatness and stability of the surface thereof. Black mask 128 prevents a leakage of light through the regions of TFT and gate, data and common bus lines 101, 102, and 103. Black mask 128 is made of a Cr or a CrOx metal layer having a thickness of 0.1 μm and a width of 10 μm or a resin. Color filter layer 129 has one of R, G, and B color filter elements in each pixel. On color filter layer 129, a second alignment layer 123b is formed by coating polyamide or polyimide or photo-alignment materials such as PVCN or polysiloxane based materials. Second alignment layer 123b is rubbed or exposed to UV light to impart an alignment direction. A liquid crystal layer 130 is formed between the two substrates 110 and 111 by injecting liquid crystal in a vacuum state.

Figure 4:
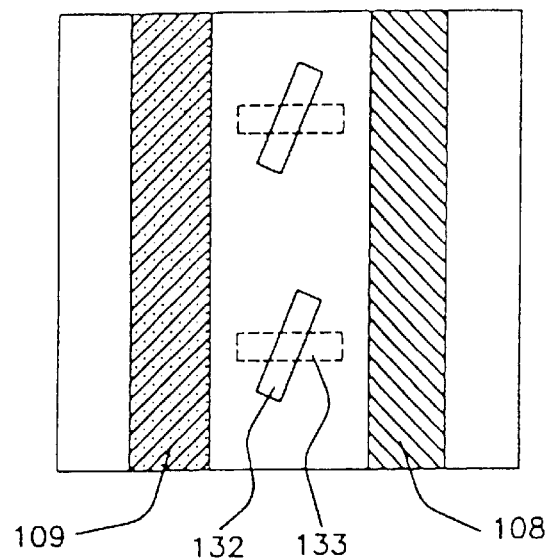
FIG. 4 is a view showing the operation of liquid crystal liquid crystal molecules in the present invention.

FIG. 4 is a view showing the operation of liquid crystal molecules in the IPS mode LCD according to the present invention. When a voltage is applied to the device, electric field parallel to the substrates is generated between common and data electrodes 108 and 109. Therefore, liquid crystal molecules 132 are rotated clockwise according to the electric field. In this figure, reference number 133 indicates the liquid crystal molecules after applying the voltage.

In the first embodiment, passivation layer 120 and gate insulator 112 do not absorb the electric field applied to liquid crystal layer 130 because common electrode 109 is disposed above two insulating layers 112 and 120. Accordingly, the driving voltage can be lowered. Further, because the common electrode is formed out of a transparent conducting layer such as ITO, the aperture ratio is improved. Furthermore, because the areas for storage capacitor can be decreased, the aperture ratio is much more improved.

Figure 5:
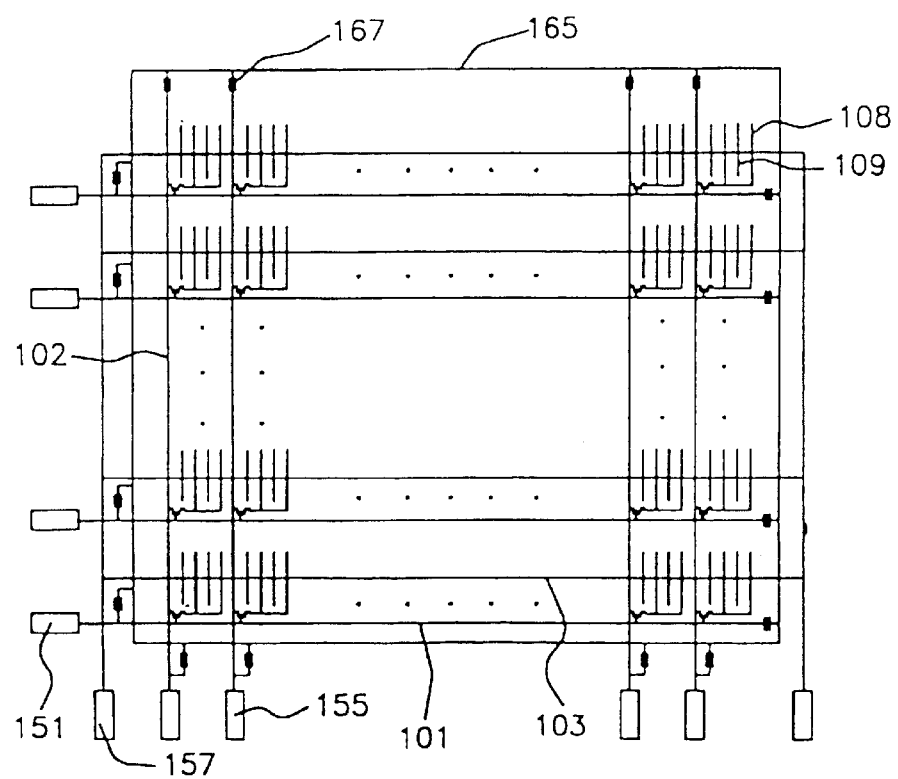
FIG. 5 is a view showing the TFT array structure of an implementation consistent with the present invention.

FIG. 5 is a view showing the TFT array structure of the present invention. Gate and data bus lines 101 and 102 are connected to gate and data driving circuits through gate and data pads 151 and 155 respectively. Gate and data bus lines 101 and 102 are connected to a grounding wiring 165 through an electrostatic discharging circuit 167 composed of TFT. Also, common bus line 103 is grounded through common pad 157.

Although not illustrated in the figure, gate, data and common pads 151, 155 and 157 are made of first, second and third metal layers. The first metal layer is formed of Mo/Al double metal layers as gate electrode 105 and common bus line 103 as shown in FIG. 2. The second metal layer is formed of Cr as source and drain electrodes 106 and 107. The third metal layer is formed of ITO as common electrode 109. In order to connect the pads to the driving circuits, it is necessary to etch the gate insulator or the passivation layer in the pad region. The two insulating layers in the pad region are etched when hole 125 is formed. In the prior art, an oxide layer is generated on the pads by the exposure to the air, causing a problem that the contacting electric resistance is increased when connecting the pads to the driving circuits. However, in this embodiment, because the third metal layer of the pads is made of ITO, the problem is not generated.

Figure 6A:
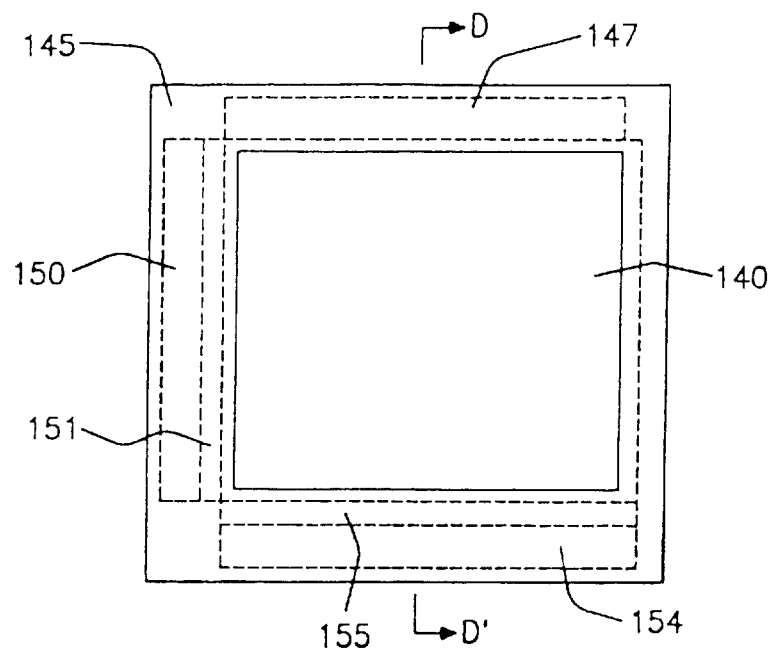
FIG. 6a and FIG. 6b are respectively plane and sectional views showing the structure of the IPS mode LCD according to the present invention.
Figure 6B:
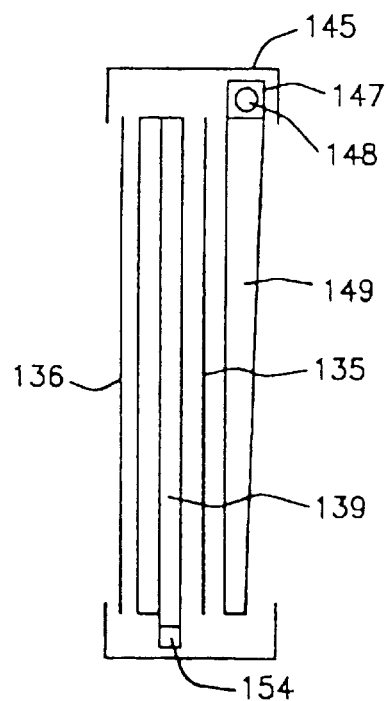

FIG. 6a and FIG. 6b are plane and sectional views showing the structure of the in-plane switching mode LCD according to the present invention. FIG. 6b is a sectional view taken along line D–D' of FIG. 6a. As shown in these figures, gate and data driving circuits 150 and 154 are disposed in a frame 145 outside display region 140. Gate and data driving circuits 150 and 154 are connected to gate and data bus lines 101 and 102 (shown in FIG. 5) through gate and data pads 151 and 155 respectively. A back light housing 147 is disposed on the upper side of frame 145. In backlight housing 147, a backlight 148 is disposed to project a light into a liquid crystal panel 139 through a light pipe 149. Between light pipe 149 and liquid crystal panel 139, a polarizer 135 is disposed to polarize the light linearly. An analyzer 136 is disposed on the front of panel 139.

Figure 7A:
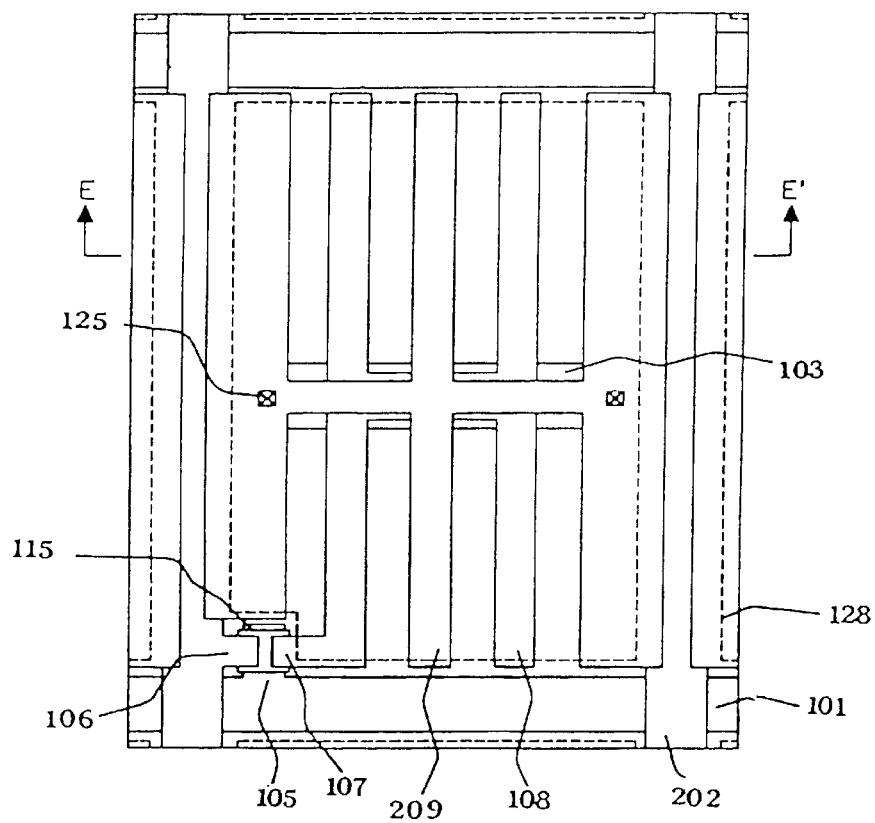
FIG. 7a and FIG. 7b are respectively plane and sectional views showing a second embodiment according to the present invention.
Figure 7B:
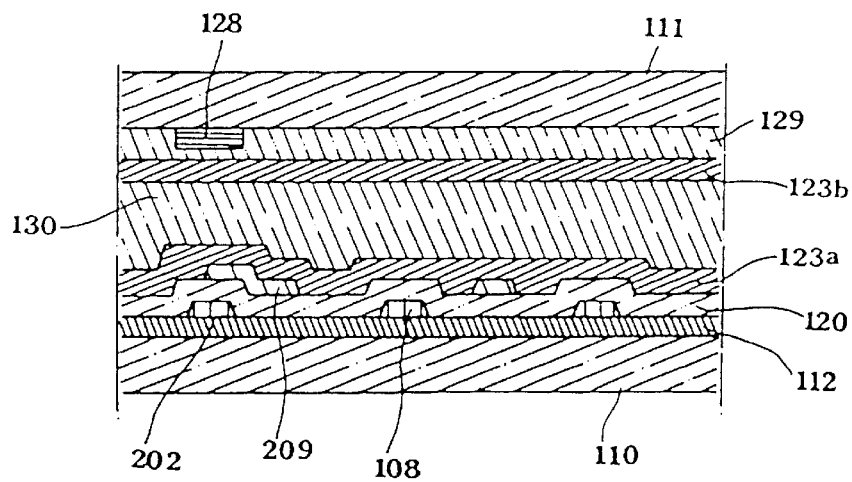

FIG. 7a and FIG. 7b are respectively plane and sectional views showing a second embodiment of the present invention. FIG. 7b is a sectional view taken along line E–E' of FIG. 7a. As shown in these figures, this embodiment differs from the first embodiment in that a common electrode 209 overlaps a data bus line 202. The parts of the second embodiment that are the same as the first embodiment are indicated by the same reference number as the first embodiment. In the second embodiment, although common electrode 209 can be made of opaque metals, it is preferable to form common electrode 209 out of a transparent conducting metal such as ITO in order to improve the aperture ratio. In general, because data bus line 202 should be separated from the pixel region to the extent of avoiding the crosstalk problem, the aperture ratio is lowered. But in this embodiment, because the electric effect by data bus line 202 is shielded by common electrode 209, the crosstalk problem can be eliminated.

Accordingly, the pixel region can be enlarged improving the aperture ratio. But, a parasitic capacitor may be formed between common electrode 209 and data bus line 202, causing the signal delay in data bus line 202. This signal delay problem can be removed by forming data bus line 202 out of low resistance metal layers such as Mo metal layer, Mo/Al/Mo triple metal layers or Cr/Al/Cr triple metal layers.

In the in-plane switching mode liquid crystal display device according to the present invention, because the common electrode is formed on the passivation layer, the passivation layer and the gate insulator do not weaken the electric field applied into the liquid crystal layer. Consequently, the driving voltage may be lowered. Further, because the common electrode overlaps the data bus line to remove the crosstalk problem, the pixel region can be enlarged, thereby improving the aperture ratio as well as the display quality. Furthermore, because the area for storage capacitor is decreased, the aperture ratio is much more improved.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal display device having a substrate and a plurality of pixel regions, each pixel region comprising:

gate, data, and common bus lines on the substrate;

a thin film transistor coupled to the gate and data bus lines;

a passivation layer on said thin film transistor and at least partially covering said data bus line; and common electrode over said passivation layer and at least partially covering said data bus line, wherein said common electrode is electrically connected with said common bus line formed below the data bus line.

2. The device according to claim 1, wherein said data bus line includes a highly conductive metal.

3. The device of claim 1, wherein the common electrode is electrically connected with the common bus line through a hole in the passivation layer.

4. The device of claim 1, wherein the common electrode includes a transparent conductive material.

5. The device of claim 1, wherein the common electrode includes indium tin oxide.

6. The device of claim 1, further comprising a pixel electrode on the substrate.

7. The device of claim 1, wherein the data bus line includes one of a Mo metal layer, Mo/Al/Mo triple metal layers, or Cr/Al/Cr triple metal layers.

8. The device of claim 1, further comprising an alignment layer on the common electrode.

9. The device of claim 8, wherein the alignment layer includes one of polyimide, polyamide, polyvinylcinnamate, or polysiloxane based materials.

10. The device of claim 1, wherein the common bus line includes Mo/Al metal layers.

* * * * *